United States Patent Office 3,437,637
Patented Apr. 8, 1969

3,437,637
NOVEL BISPHENOL POLYCARBONATES
Markus Matzner, Edison Township, Highland Park, and Louis B. Conte, Jr., Newark, N.J., assignors to Union Carbide Corporation, a corporation of New York
No Drawing. Original application Mar. 17, 1964, Ser. No. 352,655, now Patent No. 3,395,186, dated July 30, 1968. Divided and this application Dec. 13, 1966, Ser. No. 607,588
Int. Cl. C08g 17/13, 22/04; C07c 69/64
U.S. Cl. 260—47  5 Claims

ABSTRACT OF THE DISCLOSURE

Polycarbonates of bisphenols of 1,4-dimethylene cyclohexane have been prepared. These condensation polymers exhibit high glass transition temperatures, tensile strengths and tensile moduli and are useful for the fabrication of shaped articles and films.

---

This application is a division of U.S. Ser. No. 352,655, filed Mar. 17, 1964, now U.S. Patent No. 3,395,186, granted July 30, 1968.

This invention relates to novel bisphenols and condensation polymers prepared from them.

Heretofore it has been known to condense phenols with aldehydes and ketones to produce bisphenols. The bisphenols thus produced have their phenolic portions on a single carbon atom. The close proximity of the phenolic portions has limited the control which can be exercised over the properties of these known bisphenols and condensation polymers containing these bisphenol moieties. Methods have been proposed to put the phenolic portions on different carbon atoms as by a double Fries rearrangement of the phenolic esters of dibasic acids, but such processes have not been practically useful.

It is an object, therefore, of the present invention to provide bisphenols wherein the phenolic portions are attached to different carbon atoms.

It is another object to provide condensation polymers containing bisphenol moieties whose phenolic portions are attached to different carbon atoms.

It is another object to provide bisphenol condensation polymers having high glass transition temperatures and inherent toughness.

It is another object to provide a practical method for producing bisphenols whose phenolic portions are on different carbon atoms.

It is another object to provide novel bisphenols.

It has now been discovered that bisphenols having phenolic portions on different carbon atoms are prepared by contacting together 1,4-dimethylene cyclohexane and at least a stoichiometric amount of a phenol with an acidic alkylation catalyst.

The reaction shown for phenol and 1,4-dimethylene cyclohexane proceeds, in general, as follows:

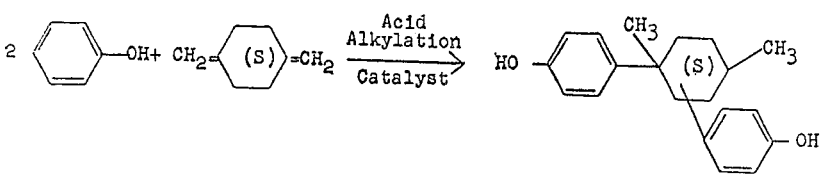

This product, a bisphenol of 1,4-dimethylene cyclohexane is a new composition of matter.

A substantial molar excess of phenol over 1,4-dimethylene cyclohexane is desirable. Thus, molar ratios of from 3 to 20 and more moles of the phenol per mole of 1,4-dimethylene cyclohexane are completely suitable. Molar ratios of from 6 to 12 moles of phenol per mole of 1,4-dimethylene cyclohexane provide good reaction rates and are easily handled, and hence, are preferred. Molar ratios of about 10 to 1 of phenol per mole of 1,4-dimethylene cyclohexane provide optimum rates with the catalyst of this invention and, hence, are particularly preferred.

The reaction can be carried out at atmospheric subatmospheric or superatmospheric pressure and at temperatures ranging from about 30° C. to about 150° C. Reaction temperatures above about 50° C. insure good viscosity in the reaction mixture and temperatures below about 125° C. permit reaction without use of elaborate pressure equipment and thus are preferred. Particularly preferred is reaction under atmospheric pressure at temperatures from 70° C. to 100° C.

The preparation of 1,4-dimethylene cyclohexane has been described in the technical literature using the diacetate of 1,4-cyclohexanedimethanol as the starting material. Pyrolysis of the latter at 625° C., followed by refractionation of the crude pyrolysate affords pure 1,4-dimethylene cyclohexane, B.P. 121.5–122° C./730 mm., $n_D^{20} = 1.4719$.

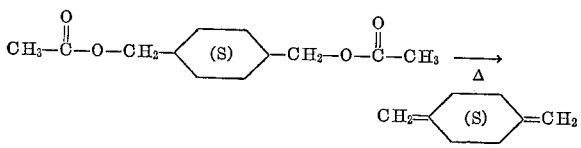

Phenols which can be reacted with 1,4-dimethylene cyclohexane to form the bisphenols of this invention are hydroxy substituted aryl compounds having a replaceable hydrogen attached to a ring carbon atom in a position preferably either ortho or para to a phenolic hydroxyl. Thus, the term "phenol" includes mono-nuclear, and polynuclear substituted and unsubstituted hydroxyaryl compounds. A "replaceable hydrogen" as the term is used in the present specification and claims is (1) a hydrogen which is attached to a carbon atom which is not impeded from reacting with 1,4-dimethylene cyclohexane by the spatial arrangement of nearby atoms forming a part of the same molecule, i.e., is sterically unhindered and (2) is electronically unhindered, i.e., is not limited in activity by the presence, in other positions on the phenolic ring, of substituents tending to attract the ortho and para hydrogen more strongly to the phenolic ring, e.g., nitro groups. Among the phenols having replaceable hydrogen in the positions ortho and para to a phenolic hydroxyl, some of those deserving of special mention are: hydroxy substituted benzenes, e.g., phenol, catechol, pyrogallol, resorcinol, phloroglucinol, and unsymmetrical trihydroxy substituted benzenes; substituted phenols having in the meta positions, ortho positions or para position, providing at least one of the ortho position or the para position is unsubstituted, one or more ortho or para directing substituents such as alkyl groups, aryl groups, alkaryl groups, aralkyl groups, halogen groups, i.e., fluorine, chlorine, bromine and iodine, alkoxy groups and aryloxy groups. Preferred as substituents in the above compounds are straight and branched chain alkyl and aralkyl groups having from 1 to 10 carbon atoms, particularly lower alkyl substituents, i.e., having from 1 to 6 carbon atoms. Among the substituted phenols those deserving of special mention are the cresols, xylenols, guaiacol, 4-ethylresorcinol, 4-methylresorcinol, 4-pyropylresorcinol, carvacrol, methylphenol, ethylphenol, butylphenol, octylphenol, dodecylphenol, eicosylphenol, tricontylphenol, and tetracontylphenol, 2,3-dimethylphenol, 2-ethyl-4-methylphenol, 2,4-diethylphenol, 2-methyl-4-butylphenol, 2-ethyl-5-methylphenol, 2-methyl-5-isopropylphenol, 2-propyl-5-methylphenol, 2-isopropyl-5-methylphenol, 2,6-dimethylphenol, 2-methyl-6-ethylphenol, 2,6-diethylphenol, 2-methyl-6-propylphenol, 3,4-dimethylphenol, 3-methyl-4-ethylphenol, 3,5-dimethylphenol, 3,5-diethylphenol, 2-chloro-4-methylphenol, 2-ethyl-4-chlorophenol, 3-chloro-4-methylphenol, 2,3,4-trimethylphenol, 2,3,5-trimethylphenol, 2,4-dimethyl-5-ethylphenol, 2-ethyl-4,5-dimethylphenol, 2,4-diethyl-5-methylphenol, 3,4,5-trimethylphenol and higher alkyl phenols.

Thus the term "bisphenol of 1,4-dimethylene cyclohexane" as used herein includes compounds having the formula:

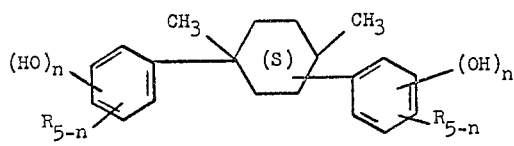

wherein R is a hydrogen, a hydrocarbon substituent free of aliphatic unsaturation, a halogen or a saturated oxyhydrocarbon substituent on a phenolic ring carbon atom, selected, for example, from alkyl, aryl, alkaryl, aralkyl, alkoxy, or fluorine, chlorine, bromine, or iodine groups and $n$ is an integer from 1 to 3. Hence, the term "phenyl" herein includes substituted phenyl radicals. The point of attachment of the above phenolic portions can be ortho or para to a phenolic hydroxyl.

The acidic alkylation catalyst used in the reaction of the above phenols with 1,4-dimethylene cyclohexane in the present invention comprises a Friedel-Crafts catalyst including the hydrogen form ($H^+$) of a cation exchanging resin, i.e., an "acidic" cation exchanging resin. These resins are insoluble in the reaction mixture and hence, there is no problem of catalyst separation from the reaction zone effluent or need of removal of small amounts of impurities in the product. Throughout the reaction and product recovery the catalyst remains in the reaction zone. The service life of the acidic cation exchanging resin in this method is nearly infinite and hence, the resin does not of necessity have to be regenerated, if care is exercised in preventing the introduction of basic metal ions such as sodium, potassium, calcium, etc. or other contaminants which inactivate the cation exchanging groups of the resin. The use of this insoluble catalyst confers the additional advantages of (1) eliminating the need for acid corrosion resistant equipment which is otherwise essential, and (2) making unnecessary any neutralization steps.

The cation exchanging resins are substantially insoluble polymeric skeletons with strongly acidic cation exchanging groups chemically bound thereto. The exchange potential of the bound acidic groups and the number of them which are available for contact with the phenol and 1,4-dimethylene cyclohexane reaction mixture determine the alkylating effectiveness of a particular cation exchanging resin. Thus, although the number of acidic groups bound to the polymeric skeleton of the resin determines the theoretical "exchange capacity" thereof, a more accurate criterion of catalytic effectiveness is the number of acidic groups available for contact with the reactants. This contact can occur on the surface or in the interior of the cation exchanging resin; therefore, a form of resin which provides a maximum amount of surface area for contact and diffusion, e.g., porous microspheres or beads, is highly desirable and affords the highest rate of reaction and reaction economy in this process. The particular physical form of the cation exchanging resin used, however, is not critical.

The cation exchanging resins should be substantially insoluble in the reaction mixture and in any solvent to which the resin may be exposed in service. Resin insolubility is generally attributable to cross-linking within the resin but can be caused by other factors, e.g., higher molecular weight or a high degree of crystallinity.

In general, the greater the exchange capacity of a resin, i.e., the greater the number of milliequivalents of acid per gram of dry resin, the more desirable is the resin. Resins having an exchange capacity greater than about two milliequivalents of acid per gram of dry resin are preferred. Particularly preferred are resins with bound cation exchanging groups of the stronger exchange potential acids. Results obtained with cation exchanging resins having bound sulfonic acid groups have been highly satisfactory. Among the cation exchanging resins which are highly deserving of special mention are: sulfonated styrenedivinylbenzene copolymers, sulfonated crosslinked styrene polymers, phenol formaldehyde sulfonic acid resins, benzene-formaldehyde-sulfonic acid resins, and the like. Most of these resins and many others are available commercially under trade names such as: Amberlite XE–100 (Rohm and Haas Co.); Dowex 50–X–4 (Dow Chemical Co.); Permutit QH (Permutit Co.); and Chempro C–20 (Chemical Process Co.).

Many cation exchanging resins are received from the manufacturer in the form of the sodium or other salt and must be converted to the hydrogen or acid form prior to use in this process. The conversion can be easily accomplished by washing the resin with a solution of a suitable mineral acid, e.g., sulfuric, hydrofluoric or hydrochloric acids. For example, a sulfonated resin can be suitably washed with a sulfuric acid solution. Salts formed during the conversion procedure are conveniently removed by washing the resin with water or solvent for the salt.

It frequently happens as a result of either the washing operation outlined above, or the manufacturer's method of shipping, that the resin will contain from 50 percent to 100 percent of its own weight of water. All but about 2% of this water as a maximum is preferably removed prior to use of the cation exchanging resin. Suitable methods for removing the water in the resin include drying the resin under reduced pressure in an oven; soaking the resin in melted anhydrous phenol for a time sufficient to fill the resin interspaces with phenol; and azeotropic distillation of water and phenol in the presence of an excess of phenol.

The resin when once conditioned in this manner to insure anhydrous conditions, i.e., <2% water throughout does not require reconditioning at any time during use. Alternatively, the resin can be conditioned after installation in the process equipment merely by running the reaction mixture through the resin until sufficient water is removed. In this latter procedure dehydration is accomplished by the phenol.

The bisphenols of this invention are readily separable from the resin catalyst by filtration and can be purified by a vacuum stripping operation which removes undesirable impurities.

The Friedel-Crafts catalyst used in this invention can also be halides such as $AlCl_3$, $AlBr_3$, $BF_3$, $ZnCl_2$, $FeCl_3$, $SnCl_4$, $TiCl_4$, $TiCl_3$, $BeCl_2$, $HfCl_4$, $ThCl_4$, $NbCl_5$, $TaCl_5$, $UCl_4$, $WCl_6$, $SbCl_5$, $BiCl_3$, $AsF_3$, and $CbCl_5$; oxides such as $Al_2O_3$, $TeO_3$ $P_2O_5$ and the like; salts of phenol such as titanium, copper, zinc and aluminum phenates; inorganic acids or acid salts as for example, HF, $H_3BO_2F_2$, $H_3PO_4$, $H_3BO_3$, HCl, $H_2SO_4$, and their salts, e.g., $AgSO_4$, $HgSO_4$, and organic acids, e.g., oxalic acid, p-toluenesulfonic acid, acetic acid plus $H_2SO_4$ and the like; and amorphous and crystalline, synthetic and natural aluminasilicates such as Linde decationized molecular sieves or zeolites. These catalysts should be employed preferably in amounts from about 1 to about 2 parts by weight per 100 parts by weight of the reaction mixture. Greater or lesser amounts, e.g., from 0.55 to 25 parts by weight per 100 parts by weight of the reaction mixture can also be used. It is preferred that these catalysts be substantially free of water, i.e., less than about 2% by weight.

bisphenol of 1,4-dimethylene cyclohexane is caused to react with piperazine a polyurethane is obtained having the structure

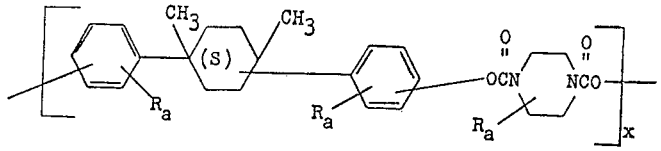

It has been found that condensation polymers can be synthesized from the bisphenols of this invention which exhibit in addition to other physical properties high glass transition temperatures, tensile strengths and tensile moduli.

For example, polycarbonates of bisphenols of 1,4-dimethylene cyclohexane can be readily prepared in interfacial condensation systems. In a preferred synthesis the dichloroformate of the bisphenol of 1,4-dimethylene cyclohexane is prepared first with phosgene and dimethylaniline. When polymerized with an aqueous sodium hydroxide-methylene chloride mixture, a polycarbonate is obtained represented by the following structure:

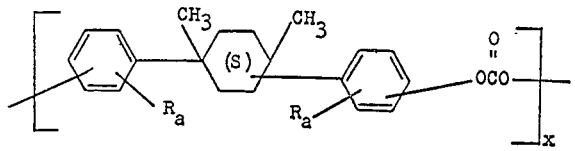

wherein x is an integer denoting the degree of polymerization and has values sufficiently high to afford a normally solid polymer, R is a member selected from the group consisting of hydrogen, halogen, hydrocarbon free of aliphatic unsaturation and saturated oxyhydrocarbon groups, and a is an integer having values of 0 to 4.

The preparation of polycarbonates of bisphenols of 1,4-dimethylene cyclohexane is not limited to this method since direct phosgenation or ester interchange utilizing a diaryl carbonate, such as diphenyl carbonate can also be employed.

As a variation bisphenols of 1,4-dimethylene cyclohexane can also be polymerized with other bisphenols as for example, Bisphenol-A, 2,2-bis(p-hydroxyphenyl)-propane, to provide carbonate copolymers.

The structure of these copolymers is represented below:

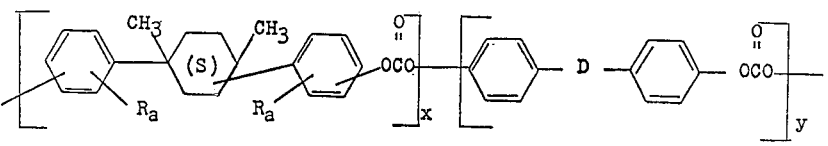

wherein R is a hydrogen, a halogen, a hydrocarbon group free of aliphatic unsaturation or a saturated oxyhydrocarbon group, a is an integer having values of 0 to 4 and D is a divalent radical such as alkylidene, cycloalkylidene, or arylene radicals, or

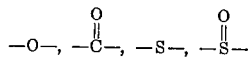

and

radicals and x and y are integers having values sufficiently high to afford normally solid polymers.

Another series of useful condensation polymers available from bisphenols of 1,4-dimethylene cyclohexane is the polyurethanes. Thus when the dichloroformate of a where x is an integer having values sufficiently high to afford a normally solid polymer, R is as defined above for the polycarbonates of this invention, and a is an integer having values of 0 to 4.

Other synthetic routes such as direct phosgenation or ester interchange can also be used to prepare these urethanes.

Polyesters of bisphenols of 1,4-dimethylene cyclohexane can be synthesized by interacting dicarboxylic acids, esters or acid halides with bisphenols of 1,4-dimethylene cyclohexane with or without the use of a solvent.

Poly(hydroxyethers) of bisphenols of 1,4-dimethylene cyclohexane can be prepared by the procedure described in French Patent 1,309,491.

Other applications for the bisphenols of 1,4-dimethylene cyclohexane include their use as hardeners for epoxy resins, bactericides, fungicides, miticides and antioxidants.

The following examples illustrate the practice of the present invention. All parts and percentages are by weight unless otherwise stated.

EXAMPLE 1

Preparation of the bisphenol of 1,4-dimethylene cyclohexane

To a three-necked, round-bottom flask equipped with a mechanical stirrer, thermometer, reflux condenser, dropping funnel and heating mantle, was added 188 g. (2 mole) of freshly distilled, molten phenol and 125 g. (about 0.5 hydrogen equivalent) of the acid form of Dowex 50 X-4 (sulfonated styrenedivinylbenzene copolymer) which has had essentially all of the water displaced by phenol. The resultant slurry was heated to 70–75° C. and heating then discontinued. Then 22 g. of 1,4-dimethylene cyclohexane (0.2 mole) was added dropwise while the exotherm was controlled with cooling water to maintain the temperature at 70–75° C. As the exotherm diminished, heat was applied. At the end of the 22 hour reaction period, the mixture was filtered and the catalyst washed with 250 ml. of freshly distilled molten phenol. The combined filtrate and washings were distilled to remove the fraction boiling up to 200° C. at 1–10 mm. The yield of crude bisphenol of 1,4-dimethylene cyclohexane remaining in the distillation pot as residue was 55 g. or 90% based on the weight of 1,4-dimethylene cyclohexane charged. A sample recrystallized from toluene for analysis had a melting point of 195° C., an hydroxyl value of 11.34% (theoretical value—11.49%) and a molecular weight of 290 (theoretical—296).

The infrared spectrum of the crystalline product obtained from toluene showed an intense band at 12 microns indicative of a p-alkylphenol. The nuclear magnetic resonance (NMR) spectrum of this crystalline product verified by a count of the relative number of aromatic and aliphatic hydrogen atoms that this was the product of two moles of phenol and one mole of dimethylene cyclohexane and that it was a true bisphenol. The NMR spectrum also suggested that this product was a mixture (approximately 1:1) of two isomers, viz., 1,4-dimethyl-1,2-bis-(p-hydroxyphenyl)cyclohexane and 1,4-dimethyl-1,3 - bis(p - hydroxyphenyl)cyclohexane. This conclusion was confirmed by thin layer chromatography which also revealed the presence of other bisphenol isomers in the toluene mother liquor after removal of the crystalline isomers.

The amount of cation exchanging resin used can be varied over a wide range with commensurate rates of reaction. Concentrations of catalyst ranging from about 0.1 to about 5 acid equivalents per mole of 1,4-dimethylene cyclohexane are preferred. Lower concentrations provide less rapid reaction rates. Cation exchanging resin concentrations ranging from about three tenths of an acid equivalent to about four acid equivalents per mole of 1,4-dimethylene cyclohexane have given excellent results and are particularly preferred.

A concentration of about one acid equivalent per mole of 1,4-dimethylene cyclohexane provides the optimum combination of reaction rate, yield, and product quality. This is a particularly desirable concentration when operating at temperatures between about 70° and 75° C. with a 10:1 ratio of phenol to 1,4-dimethylene cyclohexane.

EXAMPLE 2

Preparation of the bis(o-cresol) of 1,4-dimethylene cyclohexane

To a round bottom, three-necked flask fitted with stirrer, thermometer, reflux condenser and a dropping funnel is added 1080 grams (10 moles) of o-cresol and 250 grams (about 1 acid equivalent) of a sulfonated styrene-divinyl benzene copolymer cation exchanging resin prepared as described above by replacing with o-cresol substantially all the water therefrom, i.e., to less than 2%.

The mixture of catalyst and o-cresol is heated to 70–75° C. and 108 grams (1 mole) of 1,4-dimethylene cyclohexane is added dropwise over a 30 minute period. Cooling during this period maintains the temperature of the reactants between 70 and 75° C. After the addition and when the exotherm subsides, heat is applied for an additional 5 hours to maintain a temperature between 70 and 75° C.

After this period, the warm reaction mixture is filtered and the catalyst washed with 250 grams of molten o-cresol. The combined filtrate and washings are distilled at a reduced pressure to a final residue temperature of 200° C. at about 1 mm. Hg pressure. The residue comprises the bis (o-cresol) of 1,4-dimethylene cyclohexane.

EXAMPLE 3

Preparation of the bis(o-chlorophenol) of 1,4-dimethylene cyclohexane

The apparatus and the procedure of Example 2 are used but o-chlorophenol is substituted for the o-cresol. The residue comprises the bis (o-chlorophenol) of 1,4-dimethylene cyclohexane.

Other hydroxyaryl compounds can be reacted with 1,4-dimethylene cyclohexane to produce the corresponding bis compounds. For example, polynuclear substituted and unsubstituted hydroxyaryl compounds, e.g., the naphthols especially $\alpha$- and $\beta$-naphthols are readily reacted with 1,4-dimethylene cyclohexane using the cation exchanging resin catalysts of the present invention.

The preparation is illustrated by the following example.

EXAMPLE 4

Preparation of the bis($\alpha$-naphthol) of 1,4-dimethylene cyclohexane

In a two liter flask equipped with a stirrer, thermometer, dropping funnel and reflux condenser is placed 900 grams of $\alpha$-naphthol. The temperature is raised to 100° C. and with stirring there is added 200 grams of oven dried (105–110° C.) Dowex 50 X–4 cation exchanging resin in the acid ($H^+$) form.

Stirring is continued and 54 grams of 1,4-dimethylene cyclohexane is added dropwise over a 1 hour period at 100–105° C. Heating and stirring are continued for 4 hours after addition is completed.

The reaction mixture is filtered and the cation exchanging resin washed with 200 grams $\alpha$-naphthol. The filtrate and washings are combined and distilled at less than 0.5 mm. Hg to a final residue temperature of 200° C.

The residue is the bis ($\alpha$-naphthol) of 1,4-dimethylene cyclohexane.

EXAMPLE 5

Preparation of the dichloroformate of the bisphenol of 1,4-dimethylene cyclohexane To a slurry of 29.6 g. (0.1 mole) of bisphenol 1,4-dimethylene cyclohexane and 250 ml. of dry toluene cooled to 5° C. and contained in a 3-neck, round-bottom flask equipped with a mechanical stirrer, reflux condenser, thermometer and dropping funnel was added 19.8 g. (0.2 mole) of phosgene. A solution of 24.2 g. (0.2 mole) of N,N-dimethylaniline in 25 ml. of dry toluene was then added dropwise from the dropping funnel. The reaction mixture was stirred at ambient temperatures for about 2 hours. Insoluble dimethylamine hydrochloride was removed from the reaction product by filtration and the filtrate stripped of solvent in a vacuum distillation. The residue was dissolved in 100 ml. of methylene chloride and the solution passed through a silica gel column (12" high and 1⅝" in diameter). The product was eluted with 600 ml. of methylene chloride and the combined eluants were stripped free of solvent. The oily residue was identified by infrared absorption spectra as the dichloroformate of the bisphenol of 1,4-dimethylene cyclohexane having a typical chloroformate carbonyl absorption band at about 5.7 microns. There was no absorption at 3.0 microns, the band for phenolic hydroxyl absorption.

EXAMPLE 6

Polymerization of the dichloroformate of the bisphenol of 1,4-dimethylene cyclohexane A solution of 4.21 g. (0.01 mole) of the bisphenol of 1,4-dimethylene cyclohexane dichloroformate in 50 ml. of methylene chloride was added to a solution of 1.0 g. of sodium hydroxide, 50 ml. of water, 3 drops of triethylamine and 0.014 g. of phenol contained in a 250 ml. 3-neck Morton flask, equipped with a mechanical stirrer, reflux condenser and thermometer. The reaction mixture was stirred for ten minutes. The organic layer was washed with three 200 ml. portions of water by stirring for 10 minutes in the Morton flask. The organic layer was washed with a solution of 3 ml. of 87% $H_3PO_4$ in 100 ml. of water by stirring in the Morton flask for 30 minutes. The organic layer was washed with 200 ml. portions of water until the aqueous layer had a pH of about 6 at the end of the wash. The organic layer was then poured slowly into a Waring Blendor containing 300 ml. of isopropanol. The polycarbonate which was thus precipitated was washed in the Blendor with three, 250 ml. portions of water. The product after drying in vacuo showed a strong infrared carbonyl absorption band at about 5.65 microns and possessed a reduced viscosity of 0.68 when measured in a concentration of 0.2 g./100 ml. of chloroform at 25° C. This polycarbonate of the bisphenol of 1,4-dimethylene cyclohexane obtained may be represented by the following structure:

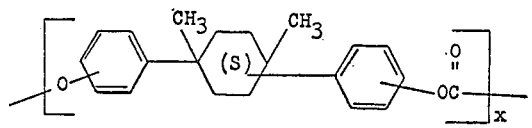

wherein $x$ is an integer having values sufficiently high to afford a normally solid polymer.

Films of this polycarbonate cast from chloroform were used for Instron analysis which revealed a tensile strength of 7,000 p.s.i., tensile modulus of 230,000 p.s.i. and an elongation of 17–75%. The glass transition temperature ($T_g$) was 240° C. and the pendulum impact was 90 ft.lbs./in.$^3$.

EXAMPLE 7

Copolymerization of the bisphenol of 1,4-dimethylene cyclohexane with Bisphenol-A dichloroformate In the apparatus described in Example 6 was stirred a solution of 1.77 g. (0.005 mole) of Bisphenol-A dichloroformate in 25 ml. of methylene chloride, 25 ml. of water, 3 drops of triethylamine, 0.5 g. of sodium hydroxide, 0.01 g. of phenol and 1.48 g. (0.005 mole) of the bisphenol of 1,4-dimethylene cyclohexane. Stirring was continued for five minutes and then the procedure described in Example 6 followed. The yield of mixed polycarbonate after drying in vacuo was 90%. This product possessed a reduced viscosity in chloroform at 25° C. of 3.64 (0.2 g. sample in 100 ml. of chloroform). Instron analysis of films of this polycarbonate cast from chloroform showed a tensile strength of 10,000 p.s.i., a tensile modulus of 270,000 p.s.i., and an elongation of 16–120%. The $T_g$ was 205° C. and the pendulum impact value was 100–600 ft.lbs./in.$^3$. The structure of this polycarbonate is shown below.

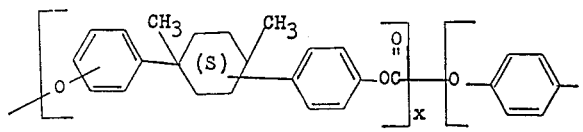

wherein $x$ and $y$ are integers having values sufficiently high to afford normally solid polymers.

The polycarbonates of this invention can be used for the fabrication of electrical switch components and connectors, instrument cases, lenses, water pump impellers and the like. Extruded film of these polycarbonates can be employed for capacitors and packaging.

EXAMPLE 8

Polyurethane from the bisphenol of 1,4-dimethylene cyclohexane and piperazine

A solution of 0.86 g. (0.01 mole) of piperazine, 1.0 g. (0.025 mole) of sodium hydroxide, 0.019 g. of phenol and 0.1 ml. of triethylamine in 50 ml. of water was charged to the reaction vessel described in Example 6. A solution of 4.21 g. (0.01 mole) of the bisphenol of 1,4-dimethylene cyclohexane dichloroformate in 50 ml. of methylene chloride was added with stirring. After 5 minutes of stirring, the aqueous layer was decanted.

The organic layer was washed twice with distilled water and then with a solution of 3 ml. of 87% $H_3PO_4$ in 100 ml. of water while stirring for one hour. The reaction mixture was then stirred with a solution of 1 ml. of concentrated ammonium hydroxide in 100 ml. of water for 1 hour. At the end of this treatment the pH of the aqueous layer was about 6.0. The organic layer was washed with water until the aqueous layer was ion free and was then poured into a Waring Blendor containing 300 ml. of isopropanol to precipitate the polyurethane of the bisphenol of 1,4-dimethylene cyclohexane which had formed. This polymer was washed three times in the Waring Blendor with 250 ml. portions of distilled water. After drying in vacuo, a yield of 70% of this polyurethane was obtained, having a reduced viscosity of 3.74 in chloroform at 25° C. (0.2 g. sample in 100 ml. of chloroform). Films of this polymer cast from chloroform had a tensile strength of 9,000 p.s.i., a tensile modulus of 220,000 p.s.i., an elongation of 7–50%, and a $T_g$ of about 260° C.

The structure of this polyurethane may be represented as shown below:

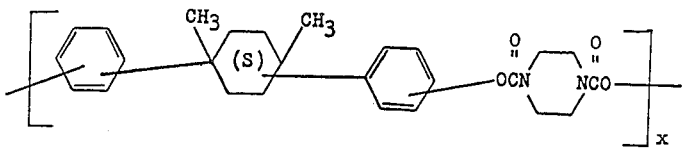

wherein $x$ is an integer having values sufficiently high to afford a normally solid polymer.

The polyurethanes of this invention can be used to provide tough, abrasion resistant finishes on floors, wire, leather and rubber goods and the like.

EXAMPLE 9

Polyurethane from the bis(o-cresol) of 1,4-dimethylene cyclohexane and piperazine The procedure and apparatus of Example 8 are used with 4.49 g. (0.01 mole) of the bis(o-cresol) of 1,4-dimethylene cyclohexane dichloroformate. The polyurethane of the bis(o-cresol) of 1,4-dimethylene cyclohexane which forms is similar in physical properties to that derived from the bisphenol of 1,4-dimethylene cyclohexane.

EXAMPLE 10

Polymerization of the dichloroformate of the bis(o-chlorophenol) of 1,4-dimethylene cyclohexane The procedure and apparatus of Example 6 are used with 4.9 g. (0.01 mole) of the bis(o-chlorophenol) of 1,4-

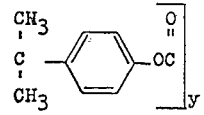

dimethylene cyclohexane dichloroformate substituted for the bisphenol of 1,4-dimethylene cyclohexane dichloroformate. The polymer which forms is the polycarbonate of the bis(o-chlorophenol) of 1,4-dimethylene cyclohexane.

Glass transition temperature ($T_g$) also referred to as second order phase transition temperatures refer to the inflection temperatures found by plotting the resilience, (recovery from 1 percent elongation) of a film, ranging in thickness from 3–15 mils, against the temperature. A detailed explanation for determining resilience and inflection point is to be found in an article by A. Brown in "Textile Research Journal" volume 25, 1955 at page 891.

The following ASTM procedures were used:

Pendulum impact—ASTM D-256-56
Tensile strength—ASTM D-882-56T
Tensile modulus—ASTM D-882-56T
Elongation to break—ASTM D-882-56T.

Reduced viscosity values were obtained from the equation:

$$\text{Reduced viscosity} = \frac{t_s - t_o}{c \cdot t_o}$$

wherein:

$t_o$ is the efflux time of the pure solvent
$t_s$ is the efflux time of the polymer solution
$c$ is the concentration of the polymer solution expressed in terms of grams of polymer per 100 ml. of solution.

Although the invention has been described in its preferred forms, it is understood that the present disclosure has been made only by way of example, and that numerous changes in the details may be resorted to without departing from the spirit and the scope of the invention.

What is claimed is:

1. The bisphenol of 1,4-dimethylene cyclohexane polycarbonate having the structure

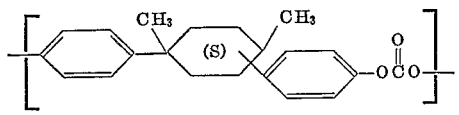

2. The polycarbonate copolymer having the structure

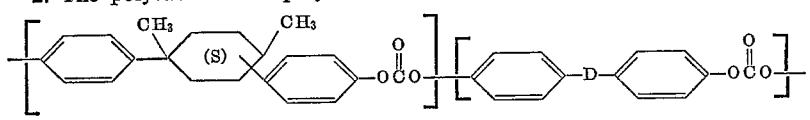

wherein D is a divalent radical selected from the group consisting of alkylidene, cycloalkylidene and arylene radicals,

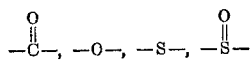

and

radicals.

3. The polycarbonate claimed in claim 2 where D is a propylidene radical.

4. The polycarbonate claimed in claim 2 wherein D is a cyclohexylidene radical.

5. The polycarbonate claimed in claim 2 wherein D is an —O— radical.

References Cited

UNITED STATES PATENTS 3,232,994  2/1966  Apel et al. _____ 260—47
3,282,893  11/1966 Shechter _____ 260—47

SAMUEL H. BLECH, *Primary Examiner.*

U.S. Cl. X.R.

260—33.8, 463, 619, 666